US006374537B1

(12) United States Patent
Van Wingerden et al.

(10) Patent No.: US 6,374,537 B1
(45) Date of Patent: Apr. 23, 2002

(54) SYSTEM FOR CONVEYING PLANT TRAYS IN A GREENHOUSE

(75) Inventors: Arie J. Van Wingerden, Monument; Jacob J. Van Wingerden, Peyton, both of CO (US)

(73) Assignee: Cherry Creek Systems, Colorado Springs, CO (US)

( * ) Notice: Subject to any disclaimer, the term of this patent is extended or adjusted under 35 U.S.C. 154(b) by 0 days.

(21) Appl. No.: 09/533,704

(22) Filed: Mar. 23, 2000

(51) Int. Cl.⁷ .................................................. A01G 9/00
(52) U.S. Cl. .......................................... 47/17; 198/817
(58) Field of Search ............................. 47/17, 1.01, 18, 47/58.1, 65, 901; 198/817

(56) References Cited

U.S. PATENT DOCUMENTS

| 2,244,677 A | 6/1941 | Cornell ............................ 47/17 |
| 2,732,929 A | 1/1956 | Delaney ...................... 198/117 |
| 3,283,882 A | * 11/1966 | Conrad |
| 3,302,615 A | 2/1967 | Tietje ............................ 119/15 |
| 3,318,442 A | * 5/1967 | Lange et al. |
| 3,529,379 A | 9/1970 | Ware ............................. 47/17 |
| 3,824,736 A | 7/1974 | Davis ............................ 47/17 |
| 3,973,353 A | 8/1976 | Dedolph ..................... 47/1.12 |
| 4,085,544 A | 4/1978 | Blake ............................ 47/39 |
| 4,216,615 A | 8/1980 | Söderberg et al. ............. 47/17 |
| 4,317,308 A | 3/1982 | Derrick et al. ................ 47/1.1 |
| 4,547,992 A | 10/1985 | Wingerden ...................... 47/17 |
| 4,628,631 A | 12/1986 | Van Wingerden .............. 47/17 |
| 4,837,971 A | 6/1989 | Visser ............................ 47/17 |
| 4,876,967 A | 10/1989 | Postma ......................... 105/30 |
| 4,930,253 A | 6/1990 | Todd, Sr. ....................... 47/65 |
| 5,353,723 A | 10/1994 | Tesch, Jr. et al. ........... 111/105 |
| 5,536,281 A | 7/1996 | Lambert ..................... 47/1.01 |
| 5,974,733 A | 11/1999 | Gyory ........................ 47/58.1 |
| 6,176,367 B1 | * 1/2001 | Patrito |

FOREIGN PATENT DOCUMENTS

| EP | 0220348 | 6/1990 | |
| GB | 1160512 | 2/1966 | |
| JP | 402215605 A | * 8/1990 | ........... B65G/17/00 |

* cited by examiner

Primary Examiner—Peter M. Poon
Assistant Examiner—Andrea M. Valenti
(74) Attorney, Agent, or Firm—Caesar, Rivise, Bernstein, Cohen & Pokotilow, Ltd.

(57) ABSTRACT

A system for conveying plant trays in a greenhouse having continuous conveyors, each in the form of a cable having cable ends spliced together and adapted to support and convey in an upright condition plant trays through the greenhouse, the continuous conveyor having an upper plant transport portion and a lower cable return portion. The system has first end and second end pulleys to receive the continuous conveyors and a motor attached to the first end pulleys to drive the continuous conveyors, whereby, the system is capable of transporting the plant trays through the greenhouse on the continuous conveyors from the first end pulleys to the second end pulleys.

12 Claims, 6 Drawing Sheets

SYSTEM FOR CONVEYING PLANT TRAYS IN A GREENHOUSE

BACKGROUND OF THE INVENTION

This invention pertains to a means for transporting large numbers of plant trays. In particular, this invention relates to a novel conveyor for transporting plant trays on cable conveyors powered by a motor to move the plant trays throughout and in and out of a greenhouse.

It is common in the nursery business to use greenhouses for germinating and growing plants. Typically, plants are planted as seeds or cuttings in 11 inch by 22 inch plastic flats. Growing of plants in greenhouses often requires frequent movement of plants from one location to another, such as from the potting shed to the germinating greenhouse, and from one area of a particular greenhouse to another to accommodate sunlight demands of the growing foliage.

A majority of greenhouses employ benches to provide a platform for laying out plants and keep the stock level elevated above the floor. Benches are typically constructed of steel, wood, plastic, or concrete frames with galvanized expanded metal, turkey wire, or special bench fabrics spread across the top. Galvanized expanded metal or other bench surfaces allow water to drain from the plants during frequent watering.

Methods currently used by greenhouses to transfer plants include the use of portable conveyors. The conveyors are typically in multiple sections with each section being ten to twelve feet long. One section, the drive section, is motorized and quite heavy. The other conveyor sections connect to the drive section through a gear mechanism at each junction. The conveyor is typically configured with numerous sections in place and sections are removed and the conveyor shortened as the benches are filled with plants.

The time and effort required to lay out and connect the sections of the conveyor and then remove sections as benches are filled is so substantial that most greenhouse operators have found that this is not acceptable. Most greenhouses have found that it is easier and more efficient to let people carry the flats. One person can typically only carry one or two flats at a time. Therefore, there is typically a lot of labor involved in moving plants around in a greenhouse, and multiple trips must be made up and down the aisles to distribute plants.

It is also known to support numerous plant trays on extended beams which stretch from inside a greenhouse to outside a greenhouse. Commercial nurseries have such facilities in order to move thousands of potted plants, supported on trays, out of the greenhouses into the natural sunlight and exposed to the rain and ambient environment. When and as the weather dictates, the trays are moved along the beams and returned to the protection of the greenhouses and, to this end, a side wall of each greenhouse is apertured to accommodate the beams thereinto.

These prior transport systems have numerous disadvantages. For example, typical plant conveyors known in the art are bulky, heavy, and expensive.

Other transport systems in the prior art include U.S. Pat. No. 4,628,631 and U.S. Pat. No. 4,547,992 which teach a cable driven system, but this is for carrying plants on hangers to a watering station.

U.S. Pat. No. 4,876,967 teaches a transporter for plant trays where the trays have rollers which ride on beams. Here, the first tray has a motor to pull a string of the wheeled trays.

U.S. Pat. No. 4,837,971 teaches a transport system in which moveable tables are provided on which plants in containers have been placed. The legs of the table have wheels that rest on rails.

U.S. Pat. No. 4,930,253 teaches a transport system in which channels filled with water float plant trays. Wires are used to support the trays. Here, a large and heavy, separate conveyor system is used.

Finally, in U.S. Pat. No. 5,974,733, a greenhouse conveyor system is taught which uses manual wheeled carts.

The present invention, uses relatively small diameter cables as the "belt" onto which the plant trays ride. The use of such cables has numerous advantages which will be discussed in detail below.

SUMMARY OF THE INVENTION

The present invention is for a system for conveying plant trays in a greenhouse. The system has continuous conveyors, each in the form of a cable having cable ends spliced together and adapted to support and convey in an upright condition plant trays through the greenhouse, the continuous conveyor having an upper plant transport portion and a lower cable return portion. The system has first end and second end pulleys to receive the continuous conveyors and a motor attached to the first end pulleys to drive the continuous conveyor, whereby, the system is capable of transporting the plant trays through the greenhouse on the continuous conveyors from the first end pulleys to the second end pulleys.

Accordingly, it is an object of the present invention to provide an apparatus for conveying plant trays in a greenhouse that overcomes the disadvantages of prior art means to convey plant trays through a greenhouse.

It is another object of the present invention to provide an apparatus for conveying plant trays in a greenhouse that produces a minimal shadow such that plants below and adjacent the apparatus receive maximum sunlight without substantial shadows.

It is yet another object of the present invention to provide an apparatus for conveying plant trays in a greenhouse that produces a minimal shadow such that plants below and adjacent the apparatus receive maximum water spray without substantial deflection of the water by the apparatus.

It is a further object of the present invention to provide an apparatus for conveying plant trays in a greenhouse that is inexpensive to purchase and to operate.

It is another object of the present invention to provide an apparatus for conveying plant trays in a greenhouse that is easy to customize.

It is still another object of the present invention to provide an apparatus for conveying plant trays in a greenhouse that has minimal complexity.

It is another object of the present invention to provide an apparatus for conveying plant trays in a greenhouse that is easy and relatively inexpensive to install.

It is yet another object of the present invention to provide an apparatus for conveying plant trays in a greenhouse that may be easily upgraded or expanded to meet differing need of a user.

It is a further object of the present invention to provide an apparatus for conveying plant trays in a greenhouse that is flexible to allow easy customized installations using standard system assemblies.

It is a still further object of the present invention to provide an apparatus for conveying plant trays in a greenhouse that uses cables that may are adjustable to provide an appropriate amount of tension.

Other objects of the present invention, as well as the novel features thereof, will become more apparent by reference to the following description, taken in conjunction with the following drawings.

DETAILED DESCRIPTION OF THE PREFERRED EMBODIMENT

Figure 1:
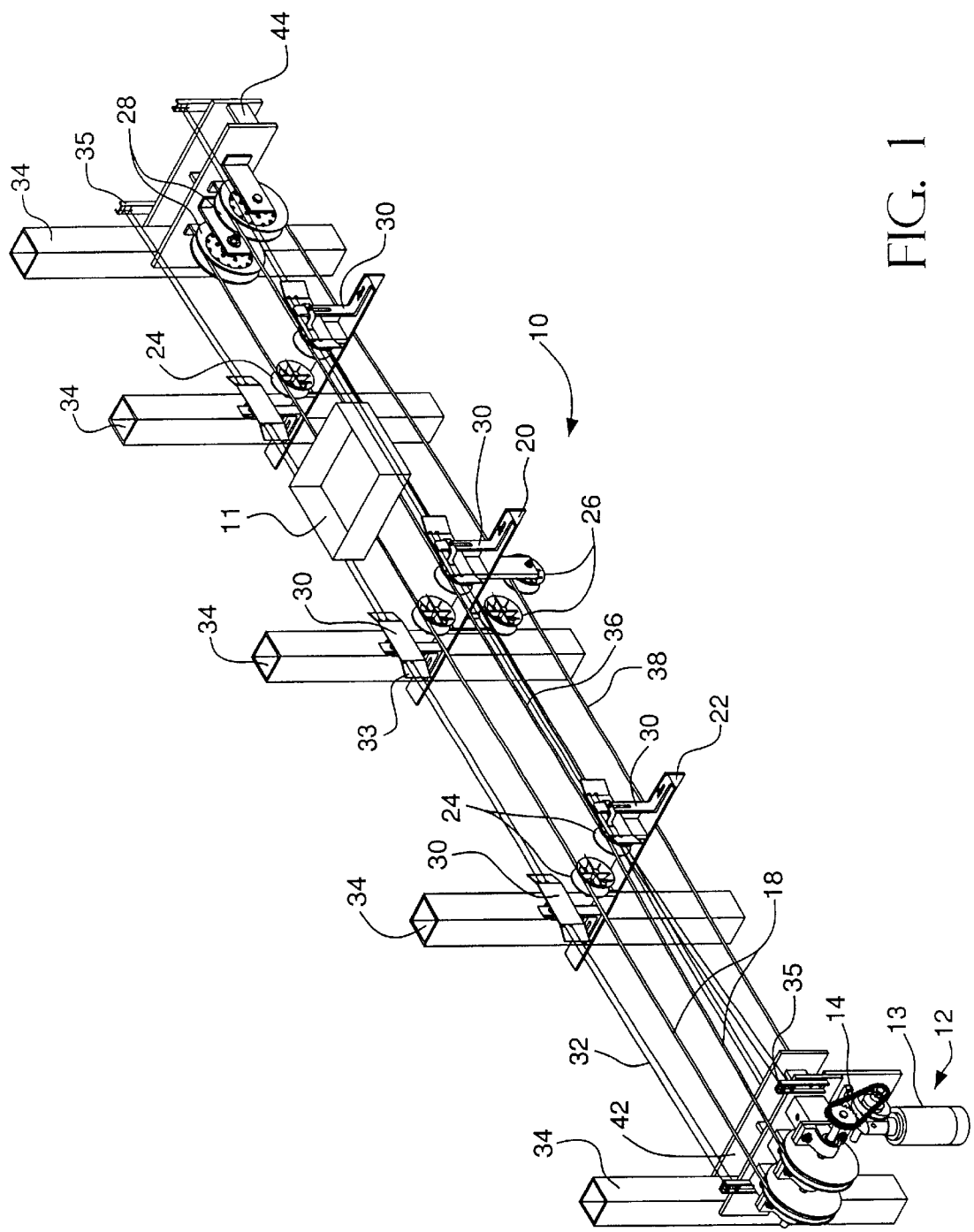
FIG. 1 is a perspective view of an apparatus for conveying plant trays in a greenhouse in accordance with one preferred embodiment of the present invention.
Figure 3:
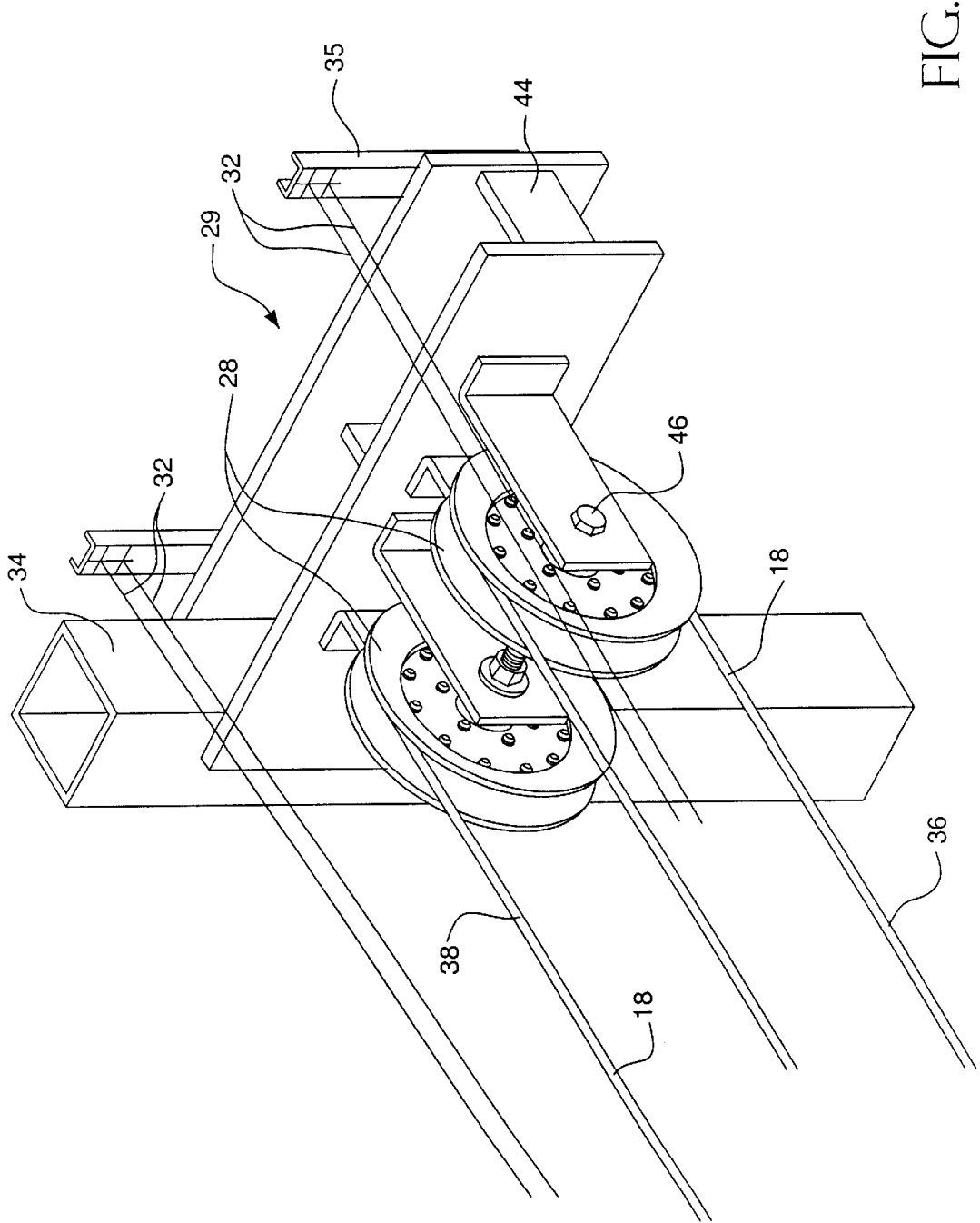
FIG. 3 is a perspective view of the end pulley assembly of FIG. 1.

Referring now to the figures wherein like reference characters in the figures refer to like elements throughout the several views, there is shown in FIG. 1 an apparatus for conveying plants trays in a greenhouse 10 in accordance with one preferred embodiment of the present invention. The apparatus for conveying plant trays 10 in a greenhouse generally includes a drive assembly 12, which includes a drive means or motor 13, a drive means speed reducer 14, preferably in the form of a chain driven by gears, and at least a pair of drive pulleys 16, a continuous conveyor cable 18 for each drive pulley 16, and an end pulley assembly 29 (see FIG. 3) which includes an end pulley 28 for each drive pulley 18. Optionally, dual central pulley assemblies 20 (see FIG. 4) and single central pulley assemblies 22 (see FIG. 5), which include upper 24 and lower 26 support pulleys may be used over longer spans to minimize conveyor cable 18 sag, as will be described in more detail below. The apparatus for conveying plant trays is supported on support walls or structural posts 34 that may or may not be part of the permanent structure of the greenhouse.

Figure 2:
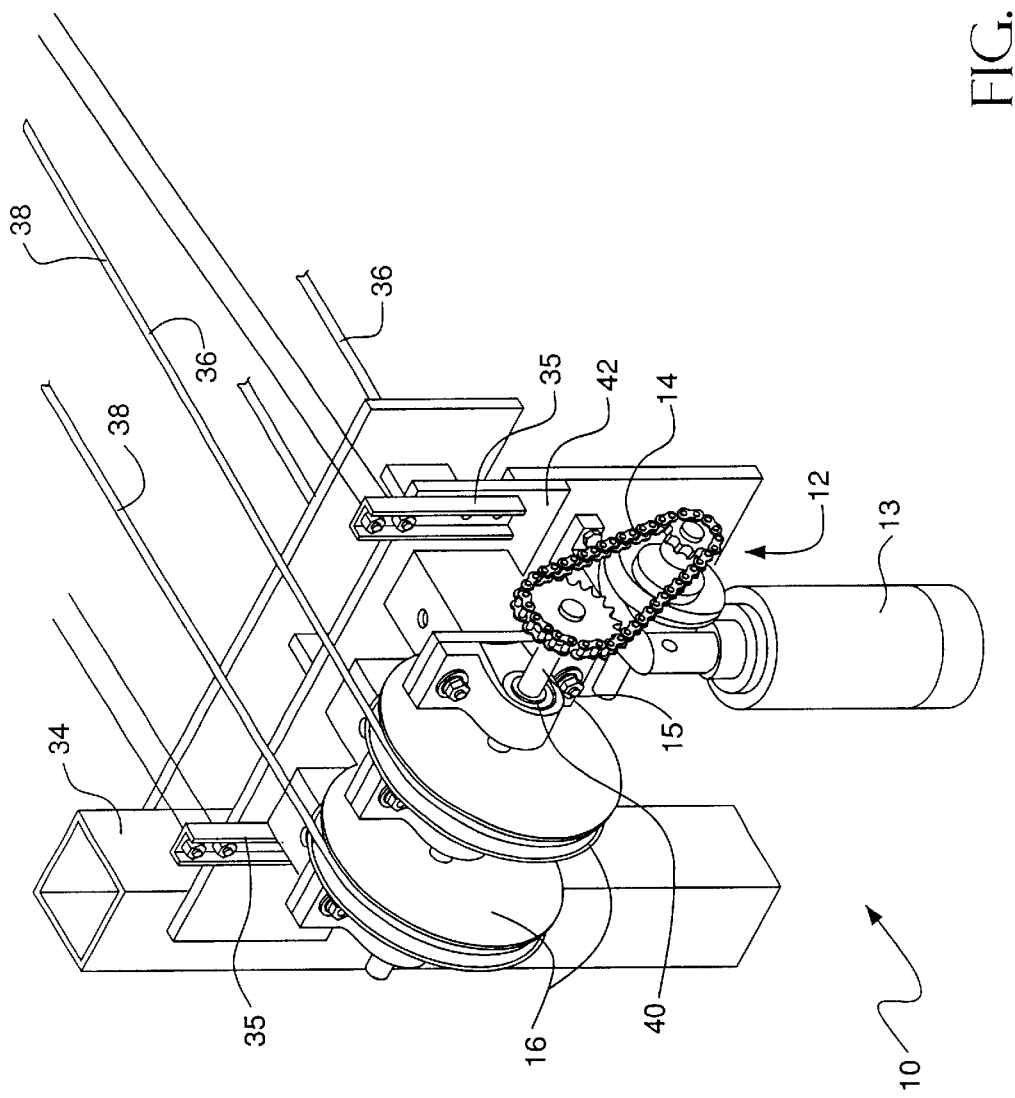
FIG. 2 is a perspective view of the motor and drive pulley assembly of FIG. 1.

As can be seen in FIG. 1, the drive assembly 13 (see FIG. 2), which includes the drive means 12 which preferably is a reversible electric motor. The required power of the drive means 12 depends upon the weight of the plant trays 11 that the conveyor system 10 is capable of carrying based on available space and the total length of the conveyor system 1 0 as well as the gear ratio of the speed reducer 14. The size of the drive means 12 or electric motor can therefore be easily be determined by one skilled in the art of conveyor systems, depending upon the requirements of the particular system installed. The drive means 12 is connected to the speed reducer 14, preferably variable, such that the speed of the conveyor system 10 can be adjusted to a user's requirements. Drive shaft 15 extends out from the speed reducer and causes drive pulleys 16 to rotate about bearings 40. The speed reducer 14 may be a chain driven by gears as depicted in the figures or any other type of drive, including direct drive, as known. Rotation of the drive pulleys 16 causes continuous conveyor cables 18 to move along the path of the pulleys as described below. This assembly is attached to a drive means mounting beam 42 which is attached to a support wall or post 34 in the greenhouse. Plant trays 11 ride atop continuous conveyor cables 18 and are moved from the drive assembly 13 to the end pulleys 29, or vice versa.

The continuous conveyor cable 18 is driven by drive means 12 and rides continuously from drive pulleys 16 to upper central pulleys 24 to end pulleys 28 to lower central pulleys 26 and back to drive pulleys 16. In the present preferred embodiment, two continuous conveyor cables 18 are used. However, depending upon a the requirements for a particular greenhouse, three more continuous conveyor cables 18 may be used, with appropriate number of pulleys.

The total length of the apparatus for conveying plant trays 10 is entirely flexible depending upon the size of the greenhouse and the needs of the operator for conveying plants. The length of the system is limited primarily by the size of the drive means 12 in combination with the speed reducer 14. Of course, for very large systems, the size of the continuous conveyor cables 18, associated pulleys 16, 24, 26, 28 and other associated components would also have to be increased accordingly.

Figure 4:
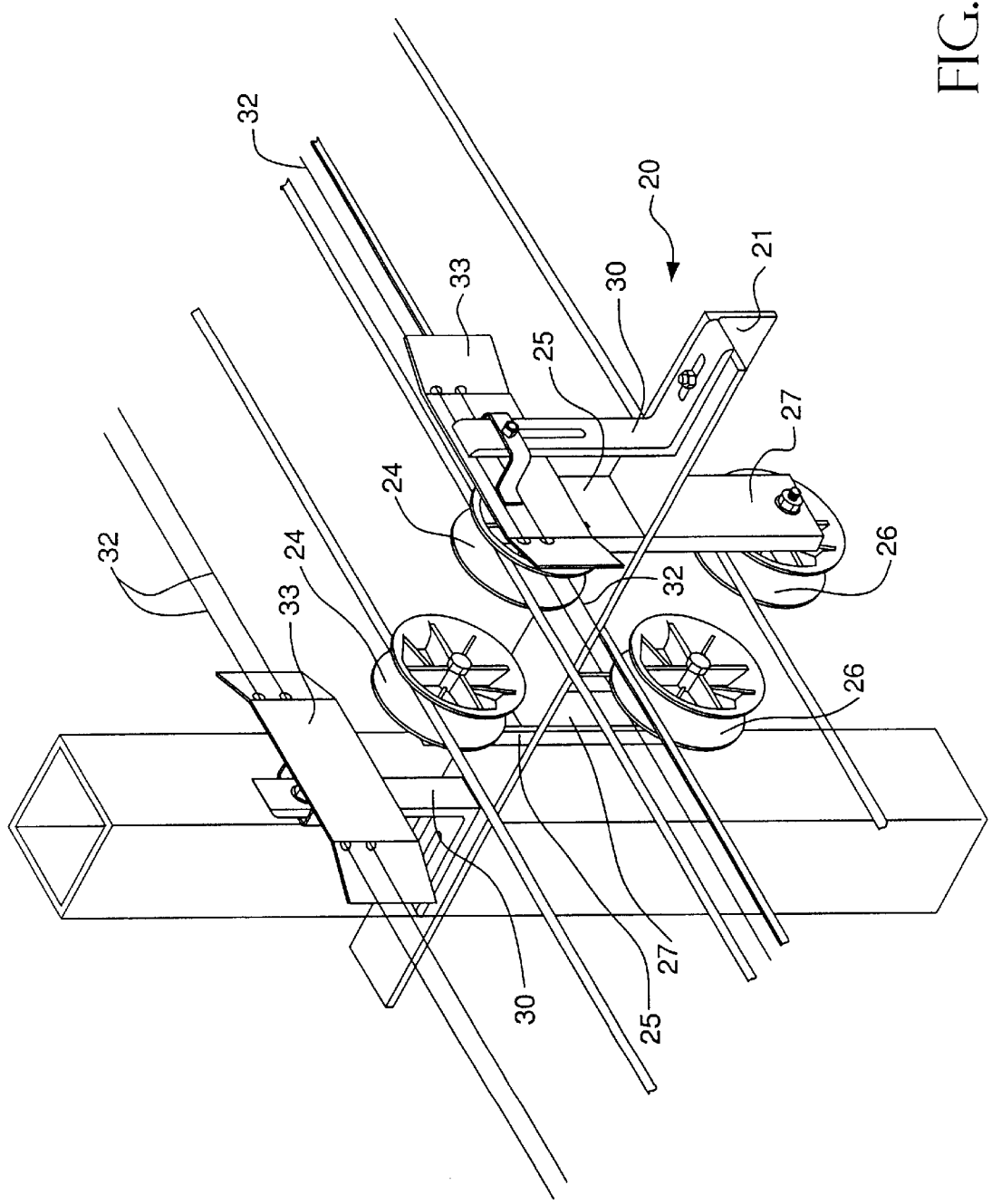
FIG. 4 is a perspective view of a dual central support pulley assembly for supporting a center area of the upper transport portion of the cable conveyor belt and the lower return portion of the cable conveyor belt of FIG. 1.
Figure 5:
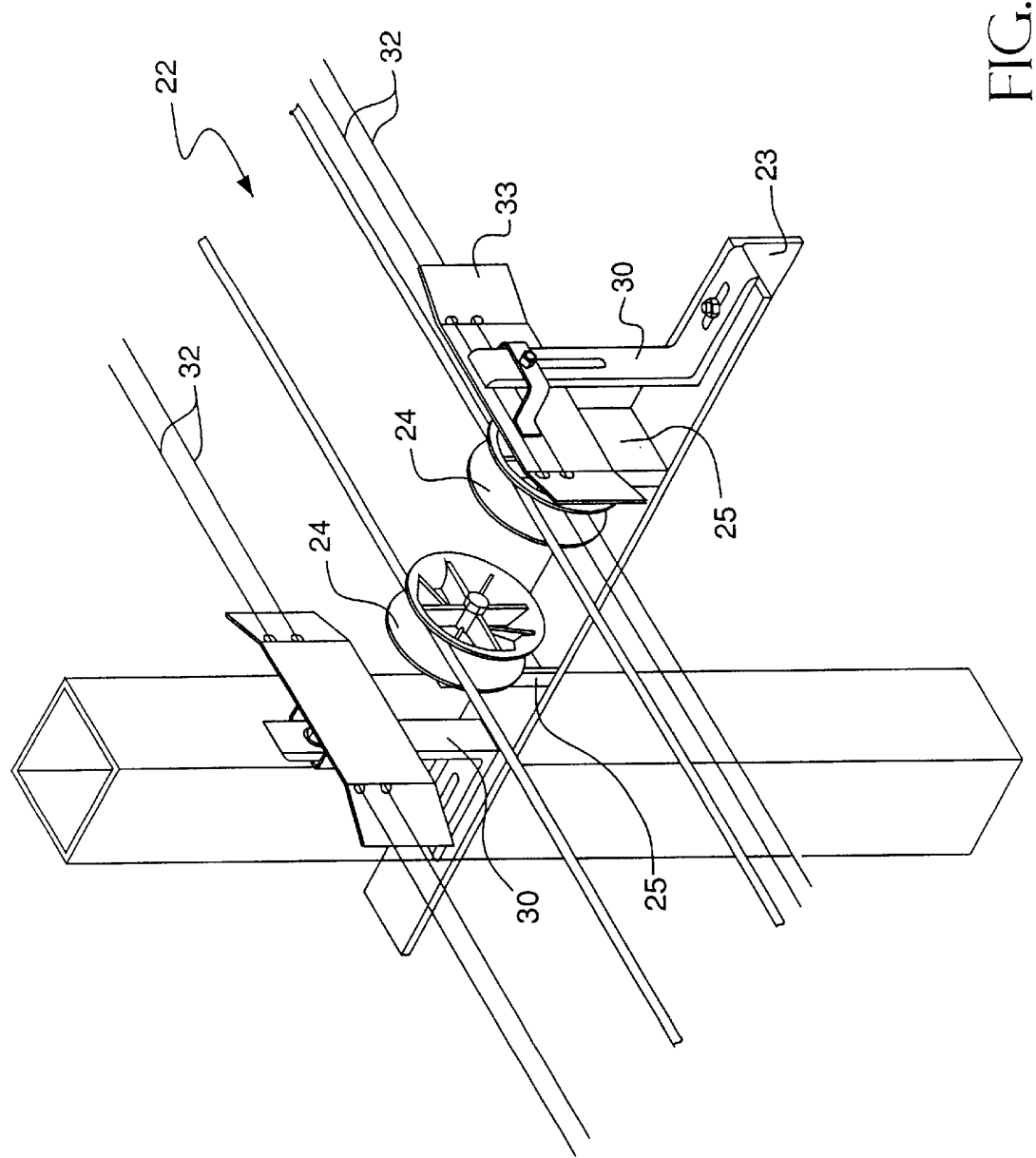
FIG. 5 is a perspective view of a single central support pulley assembly for supporting a center area of the support portion of the cable conveyor belt of FIG. 1.

Depending upon the length of the system, cable supports, may include dual central pulley assembly 20 (see FIG. 4) and/or single central pulley assemblies 22 (see FIG. 5). These assembles 20, 22 have upper central pulleys 24, and, for the dual central pulley assemblies 20, lower central pulleys 26 which may be used to aid in supporting the continuous conveyor cables 18 to reduce cable sag. In most instances, there would be a need for more upper support pulleys 24 than lower support pulleys since the weight of both the continuous conveyor cables 18 themselves and the plant trays 11 would be creating a downward load. Lower support pulleys 26 would be most useful to prevent cable sag when the system has no or a minimal number of plant trays 11. Upper pulleys 24 may be supported on either the single central pulley assembly 22 or the dual central pulley assembly 24. The single central pulley assembly 22 comprises a single central pulley support rail 23, pulleys 24, adjustable guide cable supports 30, cable attachment plates 33 and end cable attachment plates 35. The dual central pulley assembly 20 has a dual central pulley support rail 21, pulleys 24, 26, adjustable guide cable supports 30 and cable attachment plates 33. The single central pulley assembly 22 has pulleys 24 mounted only adjacent to the upper transport portion 38 of the continuous conveyor cable 18, while the dual central pulley assembly 20 has pulleys 24, 26 mounted adjacent both the upper transport portion 38 and the lower return portion 36 of the continuous conveyor cable 18. The pulleys are supported on upper pulley supports 25 and lower pulley supports 27. The end pulley assembly 29 (see FIG. 3) includes end pulleys 28 that are supported on end pulley mounting beam 44 and preferably ride in end pulley bearings that uses shafts 46 as their axle.

As can be seen in FIG. 1, and in detail in FIGS. 4 and 5, an optional feature of the present invention is the inclusion of adjustable plant tray guides, preferably in the form of guide rail cables 32. The guide rail cables 32 are attached to end cable attachment plates 35 (see FIG. 3) and central cable attachment plates 33 (see FIG. 4, 5). These plates 33, 35 are attached to adjustable guide cable supports 30. As can be seen, the adjustable guide cable supports 30 are preferably attached by a bolt to support rails 21, 23 through a slotted hole in the cable support 30 such that the guide rail cables 32 can be moved in and out, perpendicular to the travel of the conveyor cable 18 to accompany different widths of plant trays 11. Guide cable attachment plates 33 are likewise attached to the cable support 30 through a slotted hole to allow the guide rail cables 32 to be raised or lowered to a desired height above the conveyor cable 18. The guide rail cables 32 are threaded through slotted holes 37 in the cable attachment plates, thereby supporting the guide rail cables 32.

Figure 6:
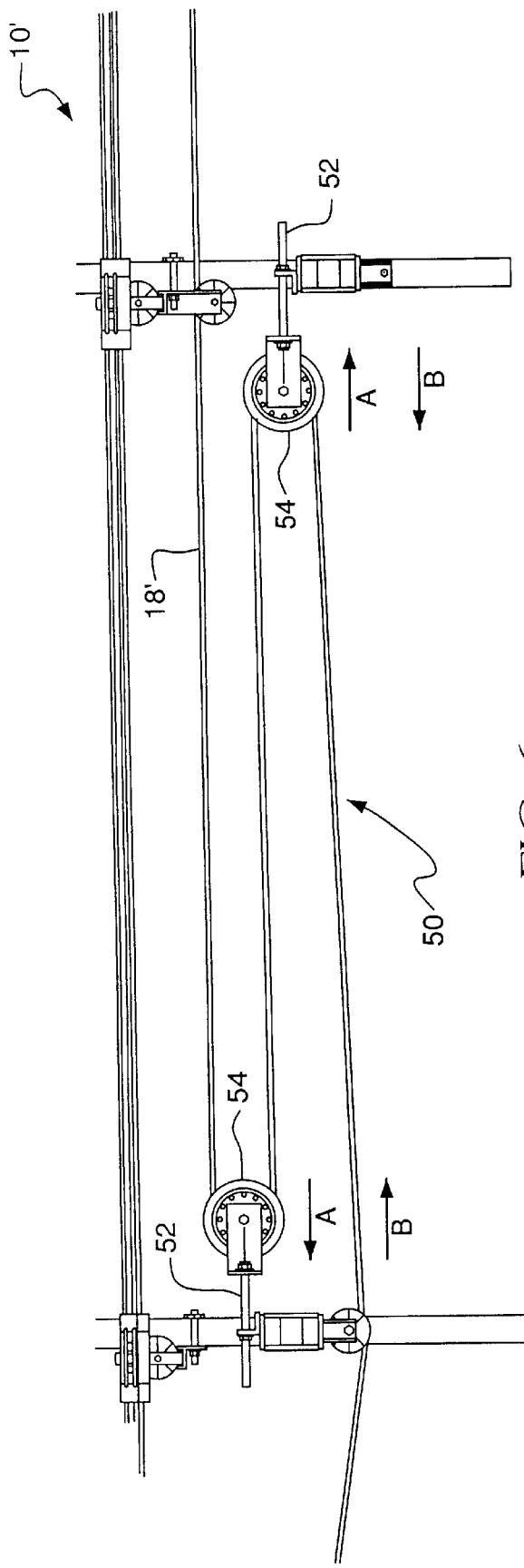
FIG. 6 is a front elevation view of an apparatus for conveying plant trays in a greenhouse in accordance with an alternate preferred embodiment of the present invention.
Figure 7:
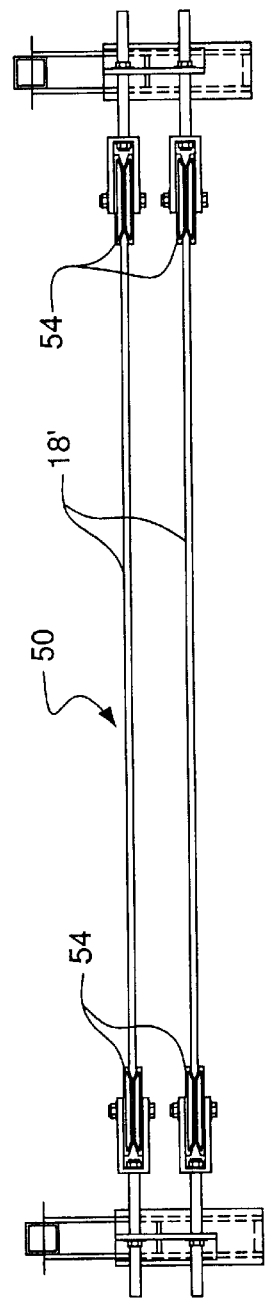
FIG. 7 is a bottom plan view of a tensioniong apparatus as used in the apparatus for conveying plant trays of FIG. 6.

In the alternate preferred embodiment of FIGS. 6 and 7, there is disclosed an apparatus for conveying plant trays in a greenhouse 10' with an optional cable tensioning apparatus 50. As can be most clearly seen in FIG. 6, the system 10' is substantially the same as that of the first embodiment, but also includes at least one section where each continuous conveyor cable 18' is looped through two sets of tensioner pulleys 54 that an have adjustment means, such as adjustment screws 52. Here, either as an initial adjustment when the system is set up, or after substantial use when the continuous cable conveyor and other parts of the system 10' are either stretched or worn, the cables can be tightened or loosened by an amount limited by the length of the screws. For example, if the continuous conveyor cables 18' require tightening, screws 52 can be rotated to draw the tensioning pulleys 64 in direction A, as shown in FIG. 6. Likewise, if the continuous conveyor cable 18' require loosening, screws 52 can be rotated to slightly release the tensioning pulleys in direction B, as shown in FIG. 6.

The continuous conveyor cables 18 are preferably constructed from a commonly available stainless steel cable or other corrosion resistant material to minimize corrosion. However, other cable materials as are known and appropriate may be used. The continuous conveyor cables 18 have ends that have been spliced together to form an endless loop. Other elements are preferably either mounted in a covered condition or made from water repellant materials such that the constant watering associated with a greenhouse does not affect performance of the system.

The present system is preferably permanently attached to structural posts 34 in a greenhouse. Since the system is primarily cable, relatively little shadow is cast to block light and water. Plants and plant trays may be placed directly under the system to maximize growing space.

Currently, costs are estimated to be five to six times less than belt driven systems as are known in the art. Additionally, it is preferable that each system is custom made to suit a particular grower's requirements. However, each system may be made from standard assemblies, including the drive assembly 13, the dual central pulley assembly 20, the single central pulley assembly 22, the end pulley assembly 29 and the conveyor cables 18 as described above. Of course, with appropriate pulleys, the present system could easily be configured to go around corners or bends.

Without further elaboration, the foregoing will so fully illustrate my invention that others may, by applying current or future knowledge, readily adapt the same for use under various conditions of service.

We claim:

1. A system for conveying plural plant trays in a greenhouse, comprising:
    a) a plurality of continuous conveyor means, each in the form of a cable having cable ends spliced together, said continuous conveyor means adapted to support and convey in an upright condition at least one of said plant trays through said greenhouse, said continuous conveyor having an upper plant transport portion and a lower cable return portion;
    b) a plurality of first end pulleys of the same quantity as that of said continuous conveyor means, each first end pulley adapted to receive at least one of said continuous conveyor means, said plurality of first end pulleys each having substantially the same working diameter;
    c) a plurality of second end pulleys of the same quantity as said continuous conveyor means; each second end pulley adapted to receive said continuous conveyor means, said plurality of second end pulleys each having substantially the same working diameter;
    d) at least one set of upper central support pulleys, each set of said central support pulleys rigidly attached to one of a plurality of structural members of said greenhouse, said upper central support pulleys adapted to support said upper plant transport portion of said continuous cable conveyor to allow the plant trays to travel without substantial deflection of the continuous conveyor means; and
    e) a drive means attached to said plurality of said first end pulleys to drive said first end pulleys which drive said continuous conveyor means;
        whereby, said system is adopted to transport said plant trays through said greenhouse on said continuous conveyor means from said first end pulleys to said second end pulleys.

2. A system for conveying plural plant trays in a greenhouse according to claim 1, including side guide rails for guiding said plant trays straight on said continuous conveyor means, said side guide rails adapted to allow said plant trays to slide along said guide rails.

3. A system for conveying plural plant trays in a greenhouse according to claim 2, wherein said side guide rails are adjustable in a direction perpendicular to said conveyor means to allow for different widths of plant trays to be conveyed, while guiding said plant trays straight along said continuous conveyor means.

4. A system for conveying plural plant trays in a greenhouse according to claim 1, including at least one set of lower central support pulley to support said lower cable return portion of said continuous conveyor means.

5. A system for conveying plural plant trays in a greenhouse according to claim 1, including a speed reduction means connected to said drive means for varying the speed of the continuous conveyor means.

6. A system for conveying plural plant trays in a greenhouse according to claim 1, including a reversing feature on said drive means to enable said system to operate in a reverse direction.

7. A system for conveying plant trays in a greenhouse according to claim 1, including a cable tensioning apparatus to vary the tension of the continuous conveyor means.

8. A system for conveying plural plant trays in a greenhouse, comprising:
    a) a plurality of continuous conveyor means, each in the form of a cable having cable ends spliced together, said continuous conveyor means adapted to support and convey in an upright condition at least one of said plant trays through said greenhouse, said continuous conveyor having an upper plant transport portion and a lower cable return portion;
    b) a plurality of first end pulleys of the same quantity as that of said continuous conveyor means, each of said plurality of first end pulleys rigidly attached to one of a plurality of structural members of said greenhouse, each first end pulley adapted to receive at least one of said continuous conveyor means, said plurality of first end pulleys each having substantially the same working diameter;

c) a plurality of second end pulleys of the same quantity as said continuous conveyor means, each of said plurality of second end pulleys rigidly attached to one of a plurality of structural members of said greenhouse, each second end pulley adapted to receive said continuous conveyor means, said plurality of second end pulleys each having substantially the same working diameter;

d) a drive means attached to said plurality of said first end pulleys to drive said first end pulleys which drive said continuous conveyor means;

e) side guide rails for guiding said plant trays straight on said continuous conveyor means;

f) at least one set of upper central support pulleys to support said upper plant transport portion of said continuous cable conveyor to allow the plant trays to travel without substantial deflection of the continuous conveyor means, each of said sets of upper central support pulleys rigidly attached to a structural member of said greenhouse; and g) at least one set of lower central support pulley to support said lower cable return portion of said continuous conveyor means;

whereby, said system is adopted to transport said plant trays through said greenhouse on said continuous conveyor means from said first end pulleys to said second end pulleys.

9. A system for conveying plural plant trays in a greenhouse according to claim 8, wherein said side guide rails are adjustable in a direction perpendicular to said conveyor means to allow for different widths of plant trays to be conveyed, while guiding said plant trays straight along said continuous conveyor means.

10. A system for conveying plural plant trays in a greenhouse according to claim 8, including a speed reduction means connected to said drive means for varying the speed of the continuous conveyor means.

11. A system for conveying plural plant trays in a greenhouse according to claim 8, including a reversing feature on said drive means to enable said system to operate in a reverse direction.

12. A system for conveying plant trays in a greenhouse according to claim 8, including a cable tensioning apparatus to vary the tension of the continuous conveyor means.

\* \* \* \* \*